United States Patent
Dutch et al.

(10) Patent No.: US 10,649,833 B1
(45) Date of Patent: May 12, 2020

(54) CONSENSUS-BASED REMEDIATION OF OFFERINGS' PROBLEMS

(71) Applicant: EMC IP Holding Company LLC, Hopkinton, MA (US)

(72) Inventors: Michael J. Dutch, Los Gatos, CA (US); Christopher H. Claudatos, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 203 days.

(21) Appl. No.: 15/648,599

(22) Filed: Jul. 13, 2017

(51) Int. Cl.
*G06F 11/00* (2006.01)
*G06F 11/07* (2006.01)
*G06F 16/248* (2019.01)
*G06F 16/2457* (2019.01)

(52) U.S. Cl.
CPC ........ *G06F 11/079* (2013.01); *G06F 11/0709* (2013.01); *G06F 11/0769* (2013.01); *G06F 11/0793* (2013.01); *G06F 16/248* (2019.01); *G06F 16/24578* (2019.01)

(58) Field of Classification Search
CPC .............. G06F 11/0769; G06F 11/079; G06F 11/0793; G06F 16/24578; G06F 16/248; G06N 5/00–048
See application file for complete search history.

(56) References Cited

U.S. PATENT DOCUMENTS

| | | | | |
|---|---|---|---|---|
| 2010/0262858 A1* | 10/2010 | Chen | .................. | G06F 11/0709 714/2 |
| 2011/0038542 A1* | 2/2011 | Barkan | ............... | G06F 11/3414 382/182 |
| 2014/0173350 A1* | 6/2014 | Roy | ...................... | G06F 11/006 714/37 |
| 2015/0052122 A1* | 2/2015 | Landry | ............... | G06F 11/0706 707/723 |
| 2016/0335414 A1* | 11/2016 | Isaacs | ................. | G06F 19/3456 |
| 2018/0052876 A1* | 2/2018 | Liu | ..................... | G06F 16/3347 |
| 2018/0253487 A1* | 9/2018 | Carteri | .......... | G06Q 10/063112 |

OTHER PUBLICATIONS

Raghavan et al., "Extracting Problem and Resolution Information from Online Discussion Forums", Computer Society of India, 16th International Conference on Management of Data COMAD 2010, Dec. 9-12, 2010 (Year: 2010).*
Install Adobe Acrobat Reader DC I Windows, https://helpx.adobe.com/acrobat/kb/install-reader-dc-windows.html, Jun. 2, 2017 (Year: 2017).*
"How do I make hyperlink to a local executable?", Stack Overflow, https://stackoverflow.com/questions/2815982/how-do-i-make-a-hyperlink-to-a-local-executable, May 12, 2010 (Year: 2010).*
Sieber, Tina, "6 Ways to Reduce Irrelevant Results on Google Search", Apr. 18, 2010 (Year: 2010).*

* cited by examiner

*Primary Examiner* — Michael Maskulinski
(74) *Attorney, Agent, or Firm* — Dergosits & Noah LLP; Todd A. Noah

(57) ABSTRACT

Consensus-based remediation of offerings' problems is described. A system can receive an indication of an offering's problem. The system identifies possible remediations for the offering's problem from on-line sources of remediations. The system determines an efficacy for each possible remediation. The system arranges each possible remediation in order based on its efficacy. The system outputs the possible remediations based on their order. The system can store the ordered possible remediations into a repository.

20 Claims, 3 Drawing Sheets

US 10,649,833 B1

CONSENSUS-BASED REMEDIATION OF OFFERINGS' PROBLEMS

BACKGROUND

Vendors offer products and/or services for sale and/or rent. Therefore, an offering can be a product, integrated products, a set of products, and/or a service. Examples of products are a laptop computer, a disc drive, and a software application. An example of a product integration is multiple storage devices used to store copies of data integrated and configured so that metadata about these copies are stored on one of these devices and the copies are stored on the other devices. Another example of a product integration is a first storage device optimized to store application data and a second storage device optimized to store copies of data which are integrated and configured so data from the first storage device are transferred to the second storage device directly without the use of another device. Examples of product sets are a laptop computer with a wireless printer, and computers connected by a local area network. Examples of services are the data backup and restore services provided by EMC Corporation's Avamar® backup/restore application and EMC Corporation's NetWorker® backup/restore application.

When an offering functions in an undesirable manner, the offering may or may not provide an error message that describes a possible problem with the offering. An offering's user or the offering's administrator may use such an error message, or free form text describing the error conditions when no error message is available, to identify possible remediations for the offering's problem.

DETAILED DESCRIPTION

An offering's user and/or the offering's administrator may spend a significant amount of time on identifying numerous possible remediations for an offering's problem. Furthermore, the offering's user and/or the offering's administrator may not be able to determine the efficacies of the numerous possible remediations without the assistance of expensive subject matter experts. Consequently, the timely and efficient remediation of an offering's problem may encounter many challenges.

Embodiments herein provide consensus-based remediation of offerings' problems. A system can receive an indication of an offering's problem. The system identifies possible remediations for the offering's problem from on-line sources of remediations. The system determines an efficacy for each possible remediation. The system arranges each possible remediation in order based on its efficacy. The system outputs the possible remediations based on their efficacy order. The system can store the ordered possible remediations into a repository.

For example, a remediation tool receives "error message 453" from a Microsoft® Word 2016 application that is executing on a Dell Inspiron® 15 5000 laptop computer and attempting to print a Microsoft® Word document on an Acme version 2.0 wireless printer. The remediation tool identifies 95 possible remediations by specifying "error message 453, Microsoft® Word 2016, Dell Inspiron® 15 5000 laptop computer, Acme version 2.0 wireless printer" when searching on-line sources of remediations that include a Microsoft® support forum, a Dell support forum, and an Acme support forum. The remediation tool deduplicates the 95 possible remediations as 19 unique possible remediations, calculates an efficacy for each of the 19 unique possible remediations, arranges each of the 19 unique possible remediations in order based on their efficacies, stores the ordered 19 possible remediations in a repository, and outputs the 5 possible remediations that have the 5 highest efficacies to a user of the Dell Inspiron® 15 5000 laptop computer. After reviewing the descriptions of the 5 possible remediations that have the 5 highest efficacies, the laptop user instructs the remediation tool to apply the possible remediation that has the second-highest efficacy to the laptop user's system that includes the Microsoft® Word 2016 application, the Dell Inspiron® 15 5000 laptop computer, and the Acme version 2.0 wireless printer, thereby providing a rapid solution to the problem identified by the error message 453, without the need for subject matter experts.

Figure 1:
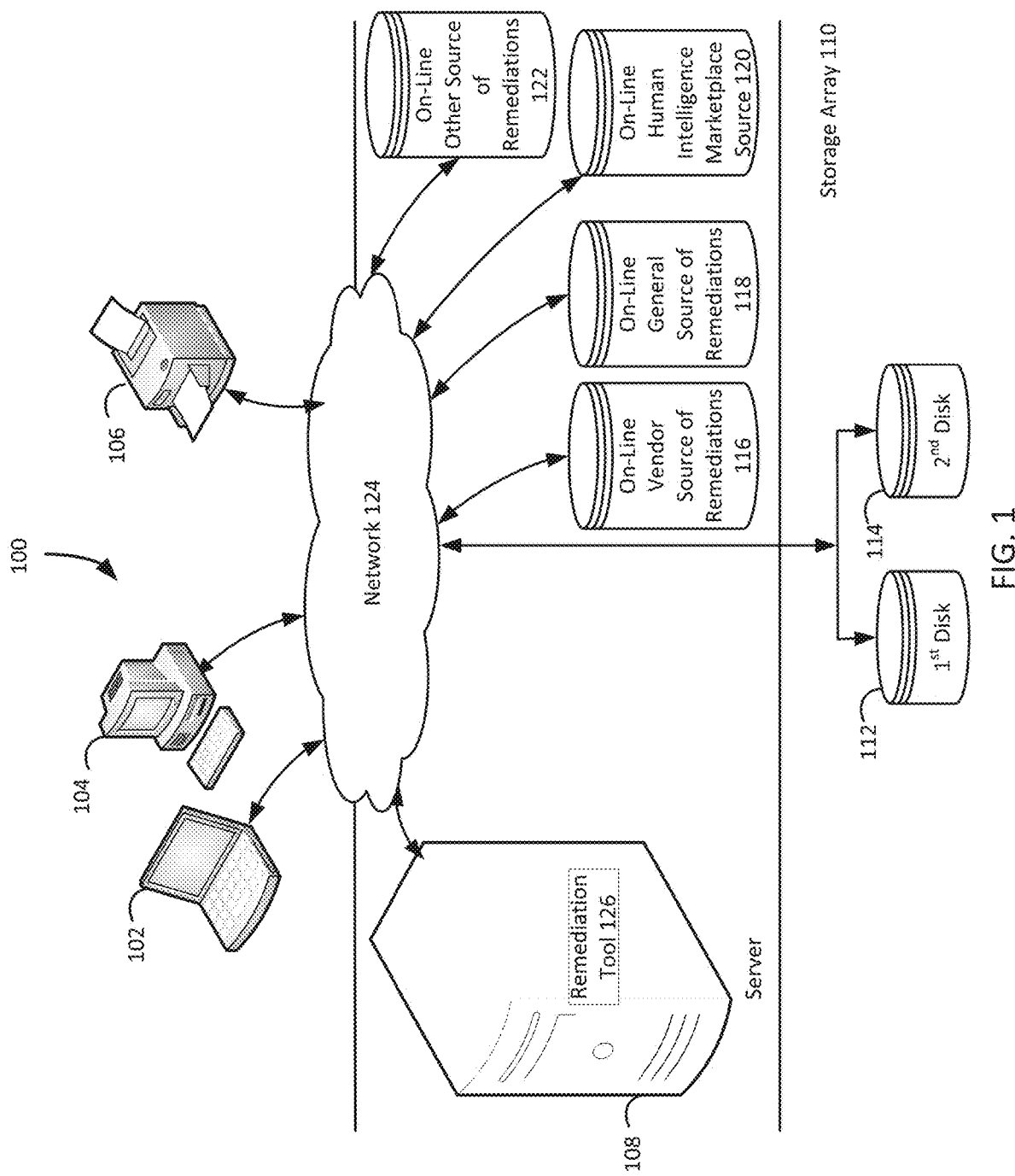
FIG. 1 illustrates a block diagram of an example system for consensus-based remediation of offerings' problems, under an embodiment.

FIG. 1 illustrates a diagram of a system for consensus-based remediation of offerings' problems, under an embodiment. As shown in FIG. 1, a system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a peripheral device 106; and a server 108 and a storage array 110 that may be provided by a hosting company. FIG. 1 depicts the first client 102 as a laptop computer 102 that may be referred to as the Dell Inspiron® 15 5000 laptop computer 102, the second client 104 as a personal computer 104 that may be referred to as the Acme personal computer 104, and the peripheral device 106 as a printer 106 that may be referred to as the Acme version 2.0 wireless printer 106. However, each of the clients 102-104 may be any type of computer, such as a server, and the peripheral device 106 may be any type of peripheral device 106. such as a scanner, an external storage device, a microphone, a loudspeaker, a webcam, or a digital camera. The storage array 110 includes a first disk 112 and a second disk 114. While FIG. 1 depicts the storage array 110 as including the disks 112-114, the disks 112-114 may be any type of storage devices. The system 100 also includes an on-line vendor source of remediations 116, an on-line general source of remediations 118, an on-line human intelligence marketplace source 120, and an on-line other source of remediations 122. The clients 102-104, the peripheral device 106, the server 108, the storage array 110, and the on-line sources of remediations 116-122 communicate via a network 124. FIG. 1 depicts the system 100 with two clients 102-104, one peripheral device 106, one server 108, one storage array 110, two disks 112-114, four on-line sources of remediations 116-122, and one network 124. However, the system 100 may include any number of clients 102-104, any number of peripheral devices 106, any number of servers 108, any number of storage arrays 110, any number of disks 112-114, any number of on-line sources of remediations 116-122, and any number of networks 124. Although FIG. 1 depicts the server 108 as including a remediation tool 126, each of the clients 102-104 may include their own remediation tool 126, or portions of the remediation tool 126. The clients 102-104 and the server 108 may each be substantially similar to the system 300 depicted in FIG. 3 and described below.

The system 100 can receive an indication of an offering's problem. For example and without limitation, this can include the remediation tool 126 receiving "error message 453" through an application programming interface from a Microsoft® Word 2016 application that is executing on the Dell Inspiron® 15 5000 laptop computer 102 and attempting to print a Microsoft® Word document on the Acme version 2.0 wireless printer 106. The indication of the problem may be received via an error message through an application programming interface, an error message that is screen-scraped from a user interface, and/or a system user input. For example, the remediation tool 126 receives the error message 453 from a screen scraper that is executing on the Dell Inspiron® 15 5000 laptop computer 102, and also receives the user's message that specialized mathematical symbols are missing from a document that was printed by the Acme version 2.0 wireless printer 106. A problem can be an undesirable functioning of a product, integrated products, a set of products, and/or a service. An indication of a problem can be the pointing out or showing of an undesirable functioning of a product, integrated products, a set of products, and/or a service. An error message can be a communication that indicates an undesirable functioning of a product, integrated products, a set of products, and/or a service. An application programming interface can be a set of clearly defined methods of communication between various software components. A user interface can be the space where interactions between humans and computers occur. A system user input can be a communication to a computer from a human that is operating the computer.

Whether or not an indication of an offering's problem has been received, the system 100 identifies possible remediations for an offering's problem from on-line sources of remediations. By way of example and without limitation, this can include the remediation tool 126 identifying 95 possible remediations by specifying "error message 453, Microsoft® Word 2016, Dell Inspiron® 15 5000 laptop computer, Acme version 2.0 wireless printer" when searching the on-line sources of remediations 116-122, which include a Microsoft® support forum, a Dell support forum, and an Acme support forum. While the remediation tool 126 may search the on-line sources of remediations 116-122 in response to receiving an indication of an offering's problem, the remediation tool 126 may also search the on-line sources of remediations 116-122 in anticipation of receiving future indications of offerings' problems, which may be frequently identified problems in the past. Although the Microsoft® support forum, the Dell support forum, and the Acme support forum are all examples of the on-line vendor source of remediations 116, which typically includes the vendor's product manuals and knowledge bases, the remediation tool 126 may also search the on-line general source of remediations 118, the on-line human intelligence marketplace source 120, and the on-line other source of remediations 122. An example of the on-line general source of remediations 118 is a support forum for computer problems, an example of the on-line human intelligence marketplace source 120 is Amazon Mechanical Turk®, and examples of the on-line other source of remediations 122 include a subject matter expert's blog and a support forum for a competitor of an offering. A possible remediation can be the act that may set right an undesirable situation. An on-line source can be a thing from which information comes or can be obtained via a connection to a computer network. A support forum can be a discussion amongst multiple people, in which each person posts comments asynchronously to each other, possibly spanning days, and the discussion typically remains online for others to see for many months or years.

The remediation tool 126 may specify various degrees of contextual details when searching the on-line sources of remediations 116-122 to identify possible remediations. For example, in addition to specifying "error message 453, Microsoft® Word 2016, Dell Inspiron® 15 5000 laptop computer, Acme version 2.0 wireless printer" when searching the on-line sources of remediations 116-122, the remediation tool 126 also specifies information that identifies the processor, the current operating temperature of the processor, operational data for the disks, the motherboard, the basic input/output system (BIOS) level, and the printer driver for the Dell Inspiron® 15 5000 laptop computer 102. In another example, the remediation tool 126 only specifies "error message 453, Microsoft® Word, Dell computer, Acme printer" when searching the on-line sources of remediations 116-122. The remediation tool 126 may use the number of identified possible remediations to vary the degrees of specified contextual details when searching the on-line sources of remediations 116-122. For example, if the number of identified possible remediations is above a maximum threshold or below a minimum threshold, the remediation tool 126 adjusts the degree of specified contextual details, and submits another search of the on-line sources of remediations 116-122.

The remediation tool 126 may search the on-line sources of remediations 116-122 serially or in parallel. For example, the remediation tool 126 evaluates the on-line sources of remediations 116-122 based on the probability that each on-line source provides a possible remediation that is specific to the offering's problem, and begins searching the on-line source based on their evaluated probabilities, from the most probable to the least probable. Continuing this example, once the number of identified possible remediations is above a maximum threshold, the remediation tool 126 can stop searching the on-line sources of remediations 116-122. In an alternative example, the remediation tool 126 simultaneously searches all of the on-line sources of remediations 116-122.

The remediation tool 126 may use natural language processing to identify possible remediations when searching the on-line sources of remediations 116-122. For example, the remediation tool 126 identifies possible remediations in a Microsoft® product manual's section "a solution for error message 453," in a support forum during which multiple participants selected a thumb's up indicator in response to a proposed solution for correcting error message 453 for Acme printers, in Amazon Mechanical Turk®'s answer to a question about error message 453, and in disparaging remarks about the Acme version 2.0 wireless printer from a support forum hosted by a competitor of Acme printers. These examples illustrate that the remediation tool 126 may use various degrees of contextual details when identifying possible remediations from the on-line sources of remediations 116-122. Searches of product manuals, knowledge bases, thousands of chat session logs, and responses from human intelligence marketplaces may result in a significantly large number of results that would require an inordinate amount of time for a human to manually sift through and decide upon the applicability of each search result to the offering's problem. However, these searches can be processed rapidly and efficiently by the remediation tool 126. A chat session can be synchronous (real time) discussions, typically with just two people, the user who describes their problem and the vendor support person who asks questions to help determine the best answer, although conceptually more than two people may be involved. A log of the chat session may be provided, such as by email, to a user at the end of the chat session, but is otherwise typically not available for other users to view.

Identifying the possible remediations for the problem associated with the offering may include normalizing the possible remediations in a common format that includes an identifier of the offering, a corresponding error message, a description of the problem, and/or a possible remediation for the problem. For example, the remediation tool 126 deduplicates the 95 possible remediations as 19 unique possible remediations, and stores the 19 unique possible remediations in a common format as normalized results. The remediation tool 126 may need to deduplicate the identified possible remediations as unique possible remediations because contributors to on-line sources of remediations may often copy remediations from other on-line sources of remediations into their own on-line sources of remediations. Continuing the example, the common format includes the identifier of the laptop computer 102 as a Dell Inspiron® 15 5000 laptop computer 102, the text for the error message 453, Microsoft®'s uniform resource locator for a description of problems that trigger the error message 453, and Acme's uniform resource locator for an automated solution for problems that trigger the error message 453. A common format can be a shared structure or arrangement of information. An identifier can be a sequence of characters used to refer to an element, such as a variable or a set of data, within the element. An offering identifier can be associated with many characteristics of an offering, as the offering identifier may be used a shorthand for a problem profile. For example, id=35 means "Microsoft Word 2016 running on a Dell Inspiron 15 1500 laptop connected to an Acme v2.0 wireless printer." An offering identifier can refer to any number of characteristics, including environment variables, such as search paths, application-specific options, and other installed software, such as Adobe AIR v26, 64-bit Java for Windows v8 update 131, Phoenix BIOS SC-T v2.1, drivers. A description can be a written representation or account of an object or event.

Having identified possible remediations, the system 100 determines an efficacy for each possible remediation. In embodiments, this can include the remediation tool 126 determining an efficacy for each of the 19 unique possible remediations. Determining the efficacies of possible remediations can be based on ranking feedback from a user of a possible remediation, a ranking of a possible remediation, a ranking of an on-line source of a possible remediation, a ranking of a contributor of a possible remediation to an on-line source of remediations, ranking a frequency of identified instances of a possible remediation, ranking a temporal proximity associated with a possible remediation, and/or a subject matter expert ranking of a possible remediation. For example, the remediation tool 126 determines an efficacy for a possible remediation based on user feedback, such as many comments in a forum alleging that the possible remediation solved their problem, thereby resulting in a high remediation ranking, participants in a chat session discussing the possible remediation and responding with approximately equal numbers of thumb's up and thumb's down indicators, thereby resulting in a medium remediation ranking, or many lengthy and abruptly ended conversations about the possible remediation in chat sessions, thereby resulting in a low remediation ranking. Although these examples describe the remediation tool 126 determining high, medium, and low rankings for possible remediations, the remediation tool 126 can determine any number of any type of rankings for possible remediations, such as numerical values from 0 to 100. An efficacy can be the ability to produce a desired or intended result. Feedback can be information about a performance of a task, such that the information can be used as a basis for improvement. A user can be a person who operates a computer. A contributor can be an entity that provides something in order to help achieve a desired result. A frequency can be the rate at which something occurs or is repeated in a given sample. An instance can be a single occurrence of something. A temporal proximity can be nearness in time. A subject matter expert ranking can be the evaluation or estimation of the nature, quality, or ability of something by a person who is an authority in a particular area or topic. A ranking can be a position in a scale of achievement or status, a classification.

In another example, the remediation tool 126 determines a high efficacy for a possible remediation identified many times in the Microsoft® support forum because the Microsoft® support forum historically provides possible remediations that frequently have a high efficacy, thus resulting in a high source ranking, and because more than a threshold number of the possible remediation were identified, thereby resulting in a high frequency ranking. This frequency ranking is based on the premise that a possible remediation is more likely to be correct the more frequent that the possible remediation is suggested. In yet another example, the remediation tool 126 determines a low efficacy for a possible remediation contributed by John Smith because the remediation tool 126 prompted the users of the possible remediation for feedback after using Smith's possible remediation, and these users frequently provided negative feedback, thereby resulting in a low "post-fix" feedback ranking, and the contributor Smith historically provided possible remediations that frequently had a low efficacy, thereby resulting in a low contributor ranking.

In an additional example, the remediation tool 126 determines a medium efficacy for a possible remediation because the possible remediation was initially provided 2 years ago while most of the offering's sub-components became available for the first time within the most recent year, thereby resulting in a medium recency ranking, and a subject matter expert's blog indicated a medium ranking of the possible remediation, thereby resulting in a medium subject matter expert ranking. Although these examples describe the remediation tool 126 determining high, medium, and low efficacies for possible remediations, the remediation tool 126 can determine any number of any type of efficacies for possible remediations, such as numerical values from 0 to 100. For example, the remediation tool 126 combines the remediation ranking score of 85, the source ranking score of 70, the contributor ranking score of 100, the frequency ranking score of 73, the feedback ranking score of 98, the recency ranking score of 87, and the subject matter expert ranking score of 82 to produce an efficacy score of 85 for a possible remediation. Since the remediation tool 126 may use a model to determine the efficacy for a possible remediation, the model may assign different weights to each of the rankings for the possible remediation based on the relative importance that the model learns over time for each ranking.

After determining an efficacy for each possible remediation, the system 100 arranges each possible remediation in order based on its efficacy. For example and without limitation, this can include the remediation tool 126 arranging each of these 19 unique possible remediations in order based on their efficacies, such that a possible remediation with an efficacy score of 86 has the highest efficacy, a possible remediation with an efficacy score of 85 has the second highest efficacy, a possible remediation with an efficacy score of 82 has the third highest efficacy, a possible remediation with an efficacy score of 78 has the fourth highest efficacy, and a possible remediation with an efficacy score of 68 has the fifth highest efficacy, etc. An order can be the arrangement or disposition of things in relation to each other according to a particular sequence, pattern, or method.

Before or after the possible remediations are arranged in efficacy order, the system 100 can store the possible remediations into a repository for subsequent use. By way of example and without limitation, this can include the remediation tool 126 storing the ordered 19 possible remediations in the storage array 110, such that over time the coverage and rapidity of identifying possible remediations improves. A repository can be a central location in which data is stored and managed.

Having arranged possible remediations in efficacy order, the system 100 outputs the possible remediations based on their efficacy order. In embodiments, this can include the remediation tool 126 outputting the 5 possible remediations that have the 5 highest efficacies to a user of the Dell Inspiron® 15 5000 laptop computer 102. Outputting possible remediations based on their efficacy order may include outputting only a portion of the possible remediations, which are immediately available for a user's viewing, with the remainder of the possible remediations being available for the user's subsequent viewing in response to a subsequent user input. The possible remediations that are output may include corresponding uniform resource locators that provide a description of a corresponding possible remediation and/or enable automated application of a corresponding possible remediation. For example, the remediation tool 126 outputs 5 uniform resource locators that describe the 5 possible remediations that have the 5 highest efficacies, with 3 of the 5 uniform resource locators including links to automated applications of their corresponding possible remediations, and enables a user to scroll down below the displayed 5 possible remediations that have the 5 highest efficacies to view the remaining 14 possible remediations. A uniform resource locator can be a reference to a web asset that specifies its location on a computer network and a mechanism for retrieving it. Automated application can be the action of something putting itself into operation with little or no direct human control.

In contrast to providing a single possible remediation from a single source of remediations, the remediation tool 126 provides multiple possible remediations for an offering's problem from the multiple on-line sources of remediations 116-122. For example, after reviewing the descriptions of the 5 possible remediations that have the 5 highest efficacies, the laptop user instructs the remediation tool 126 to apply the possible remediation that has the second highest efficacy by executing a script to download a supplemental font set to the Acme version 2.0 wireless printer 106, thereby providing a rapid solution to the problem identified by the error message 453, without the need for subject matter experts. In this example, after the remediation tool 126 received the error message 453 from a Microsoft® Word 2016 application executing on the Dell Inspiron® 15 5000 laptop computer 102, the remediation tool 126 searched the Microsoft® support forum and the Dell support forum, and determined that the error message 453 was only reporting a symptom of an underlying problem. The remediation tool 126 determined that neither the Microsoft® Word 2016 application nor the Dell Inspiron® 15 5000 laptop computer 102 caused the problem that triggered the error message 453. When the remediation tool 126 searched all of the on-line sources of remediations 116-122, which include the Acme support forum, the remediation tool 126 was able to determine that the Acme version 2.0 wireless printer 106 caused the problem that triggered the Microsoft® Word 2016 application executing on the Dell Inspiron® 15 5000 laptop computer 102 to output the error message 453. If the context of the offering is not taken into consideration when searching on-line sources of remediations, information in each on-line source may suggest a possible remediation for a single component of an offering that is isolated from the other components of the offering, which may result in remediating only the symptoms of the problem instead of remediating the cause of the problem.

After identifying possible remediations for an offering's problem from on-line sources of remediations, the remediation tool 126 can output a sequence of multiple possible remediations, with the multiple possible remediations identified from multiple on-line sources of remediations. For example, the remediation tool 126 identifies a BIOS update from a Cisco forum, an operating system patch from a Microsoft® forum, and a printer driver installation from an Acme support forum, as 3 possible remediations for a problem indicated by an error message 9171 from the Acme personal computer 104. Then the remediation tool 126 determines that the 3 possible remediations should be sequenced to first update the BIOS, next to patch the operating system, and then to install a printer driver for the Acme version 2.0 wireless printer 106 in the Acme personal computer 104. Consequently, the remediation tool 126 downloads the BIOS update from the Cisco forum, verifies the BIOS update, and then uses the BIOS update to update the BIOS in the Acme personal computer 104. After verifying that the BIOS has been updated, the remediation tool 126 downloads the operating system patch from the Microsoft® forum, verifies the operating system patch, and then uses the operating system patch to patch the operating system in the Acme personal computer 104. Following verification that the operating system has been patched, the remediation tool 126 downloads the printer driver from the Acme forum, verifies the printer driver, and then installs the printer driver in the Acme personal computer 104. While some on-line sources of remediations 116-122 suggest that implementing only the BIOS update and the operating system patch are sufficient to solve the problem that triggered the error message 9171, the remediation tool 126 determines that the most recently suggested possible remediations also required the driver installation. Following the outputting of the possible remediations, the remediation tool 126 prompts the user to whom the output was sent to provide any feedback for any possible remediations that the user may have attempted. This "post-fix" feedback for the possible remediations can also be included in future executions by the remediation tool 126 when determining or calculating the efficacies of these possible remediations.

After outputting possible remediations, the system 100 can receive another indication of the problem associated with an offering. For example and without limitation, this can include the remediation tool 126 receiving the same error message 453 from a Microsoft® Word 2016 application that is executing on another Dell Inspiron® 15 5000 laptop computer and attempting to print a Microsoft® Word document on another Acme version 2.0 wireless printer.

Following any indication of the same problem with another offering, the system 100 can identify the possible remediations from the repository. By way of example and without limitation, this can include the remediation tool 126 quickly retrieving the 19 possible remediations from the storage array 110, and subsequently identifying possible remediations by providing "error message 453, Microsoft® Word 2016, Dell Inspiron® 15 5000 laptop computer, Acme version 2.0 wireless printer" to search the on-line sources of remediations 116-122, which include a Microsoft® support forum, a Dell support forum, and an Acme support forum.

Figure 2:
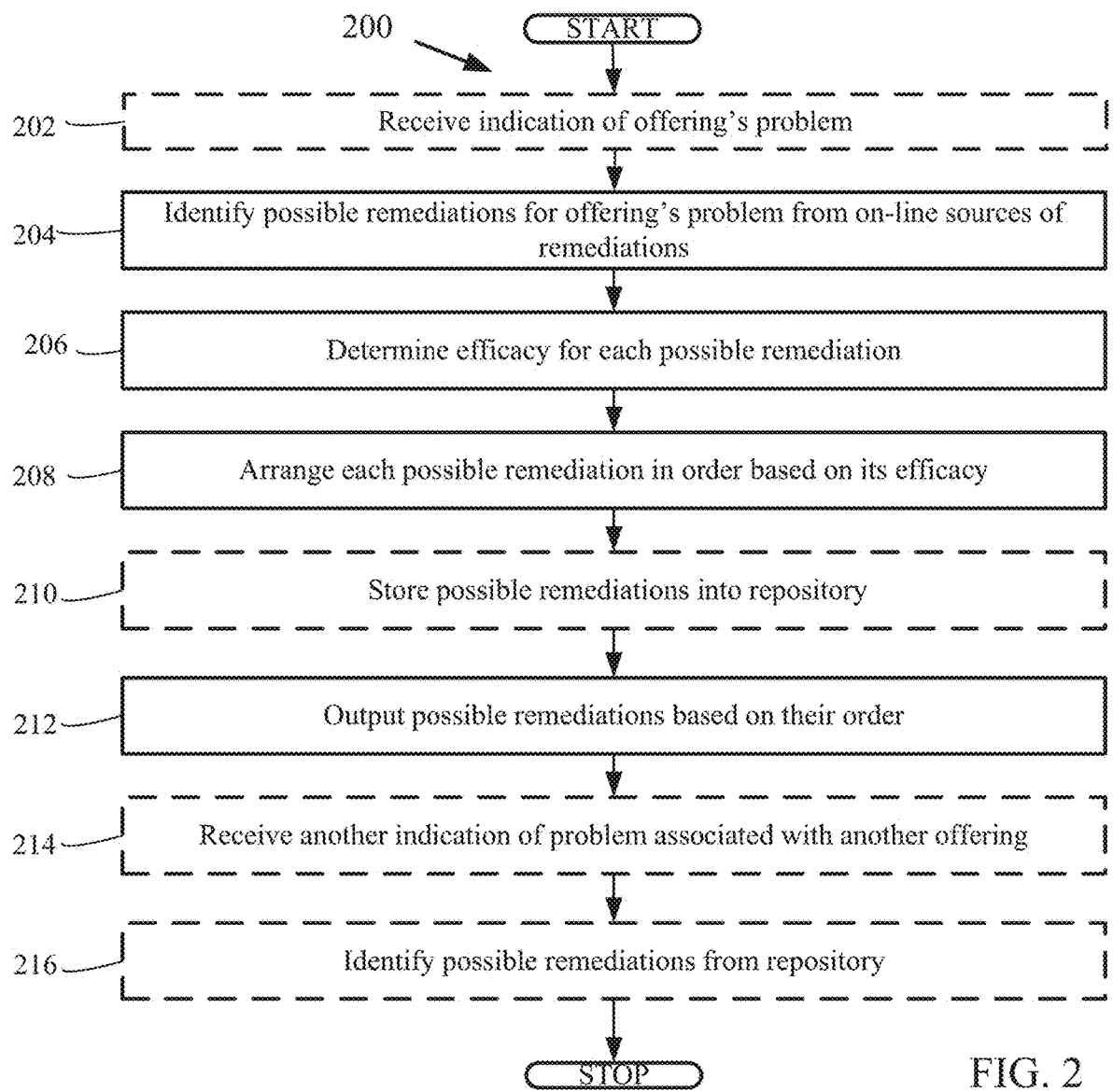
FIG. 2 is a flowchart that illustrates an example method for consensus-based remediation of offerings' problems, under an embodiment.

FIG. 2 is a flowchart that illustrates a method for consensus-based remediation of offerings' problems, under an embodiment. Flowchart 200 illustrates method acts illustrated as flowchart blocks for certain steps involved in and/or between the clients 102-104 and/or the server 108 of FIG. 1.

An indication of an offering's problem is optionally received, block 202. The system 100 can receive indications of problems that will be remediated based on consensus. For example and without limitation, this can include the remediation tool 126 receiving the error message 453 from a Microsoft® Word 2016 application that is executing on the Dell Inspiron® 15 5000 laptop computer 102 and attempting to print a Microsoft® Word document on the Acme version 2.0 wireless printer 106.

Whether or not an indication of an offering's problem has been received, possible remediations are identified for an offering's problem from on-line sources of remediations, block 204. The system 100 identifies a problem's possible remediations from on-line sources. By way of example and without limitation, this can include the remediation tool 126 identifying 95 possible remediations by specifying "error message 453, Microsoft® Word 2016, Dell Inspiron® 15 5000 laptop computer, Acme version 2.0 wireless printer" when searching the on-line sources of remediations 116-122, which include a Microsoft® support forum, a Dell support forum, and an Acme support forum.

Having identified possible remediations, an efficacy is determined for each possible remediation, block 206. The system 100 uses consensus to determine the efficacy of each possible remediation. In embodiments, this can include the remediation tool 126 deduplicating the 95 possible remediations as 19 unique possible remediations, and determining an efficacy for each of the 19 unique possible remediations.

After determining an efficacy for each possible remediation, each possible remediation is arranged in order based on its efficacy, block 208. The system 100 arranges each possible remediation in efficacy order. For example and without limitation, this can include the remediation tool 126 arranging each of these 19 unique possible remediations in order based on their efficacies.

Before or after the possible remediations are arranged in efficacy order, the possible remediations are optionally stored into a repository, block 210. The system 100 can store consensus-based possible remediations for offerings' problems. By way of example and without limitation, this can include the remediation tool 126 storing the ordered 19 possible remediations in the storage array 110.

Having arranged possible remediations in efficacy order, the possible remediations are output based on their efficacy order, block 212. The system 100 outputs consensus-based possible remediations. In embodiments, this can include the remediation tool 126 outputting the 5 possible remediations that have the 5 highest efficacies to a user of the Dell Inspiron® 15 5000 laptop computer 102.

After outputting possible remediations, another indication is optionally received of the problem associated with another offering, block 214. The system 100 can receive an indication of the same problem that was remediated. For example and without limitation, this can include the remediation tool 126 receiving the same error message 453 from a Microsoft® Word 2016 application that is executing on another Dell Inspiron® 15 5000 laptop computer and attempting to print a Microsoft® Word document on another Acme version 2.0 wireless printer.

Following any indication of the same problem with another offering, the possible remediations are optionally identified from the repository, block 216. The system 100 can retrieve the consensus-based remediations that have been arranged in efficacy order and stored. By way of example and without limitation, this can include the remediation tool 126 retrieving the 19 possible remediations from the storage array 110, and identifying possible remediations by specifying "error message 453, Microsoft® Word 2016, Dell Inspiron® 15 5000 laptop computer, Acme version 2.0 wireless printer" when searching the on-line sources of remediations 116-122, which include a Microsoft® support forum, a Dell support forum, and an Acme support forum.

Although FIG. 2 depicts the blocks 202-216 occurring in a specific order, the blocks 202-216 may occur in another order. In other implementations, each of the blocks 202-216 may also be executed in combination with other blocks and/or some blocks may be divided into a different set of blocks.

Figure 3:
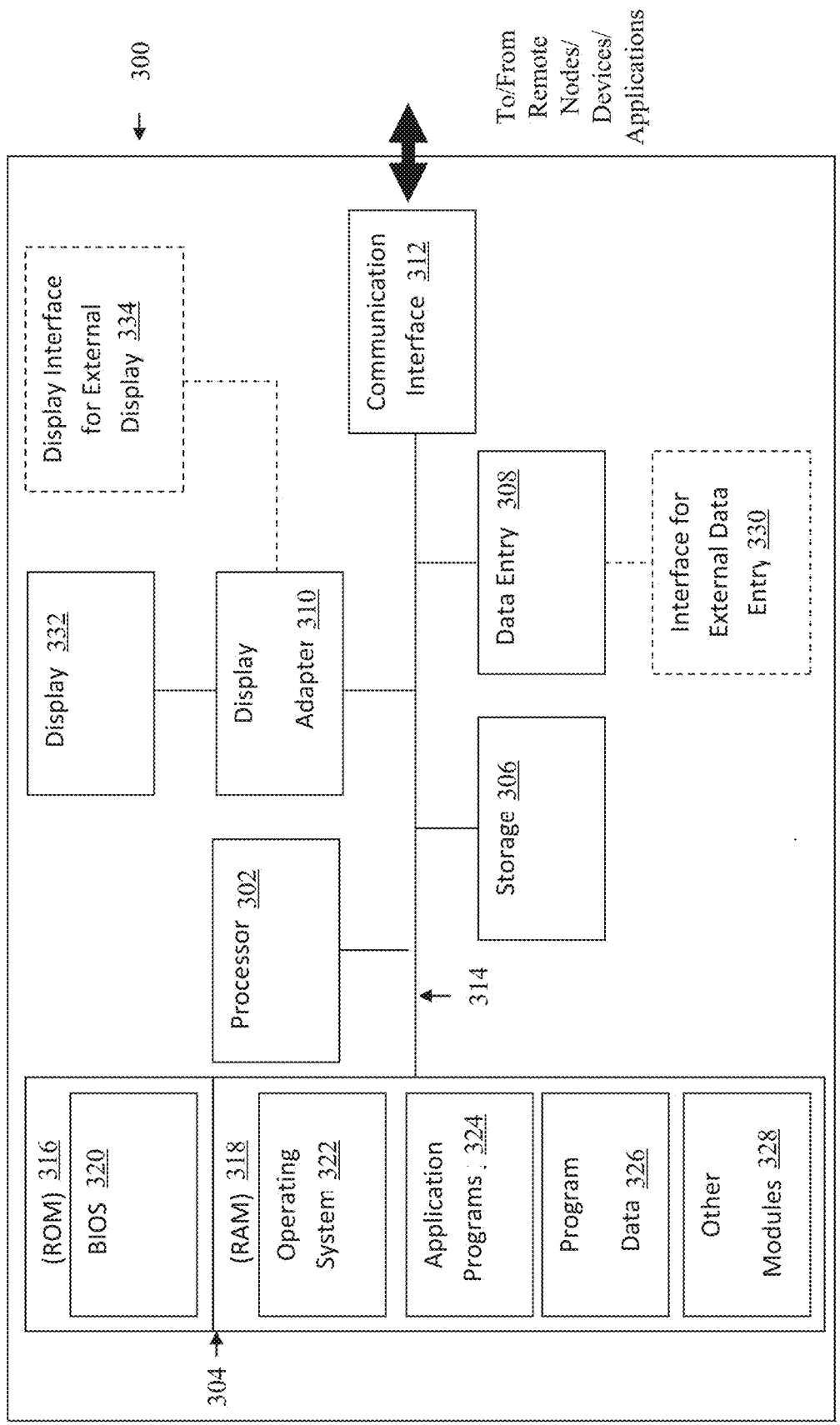
FIG. 3 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random access memory (RAM) 318. The memory 304 may be configured to store program instructions and data during operation of the hardware device 300. In various embodiments, the memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system comprising:
   one or more processors; and
   a non-transitory computer readable medium storing a plurality of instructions, which when executed, cause the one or more processors to:
   identify, from a plurality of on-line sources of remediations, a first plurality of possible remediations for a problem associated with an offering based on a specified degree of contextual details;
   adjust the degree of contextual details when a number of identified possible remediations is at least one of above a maximum threshold or below a minimum threshold;
   identify, from the plurality of on-line sources of remediations, a second plurality of possible remediations based on the adjusted degree of contextual details;
   determine a plurality of efficacies corresponding to the second plurality of possible remediations;
   arrange, based on the plurality of corresponding efficacies, each of the second plurality of possible remediations in order; and
   output, based on their corresponding order, the second plurality of possible remediations, the outputted second plurality of possible remediations including a corresponding plurality of uniform resource locators that enable automated application of a corresponding possible remediation.

2. The system of claim 1, wherein a processor-based application further causes the one or more processors to receive an indication of the problem associated with the offering, the indication of the problem being received via at least one of an error message through an application programming interface, an error message that is screen-scraped from a user interface, and a system user input.

3. The system of claim 1, wherein the plurality of on-line sources of remediations comprises at least one of support information that is associated with a vendor of the offering, support information that lacks association with the vendor of the offering, and a human intelligence marketplace.

4. The system of claim 1, wherein identifying the second plurality of possible remediations for the problem associated with the offering comprises normalizing the second plurality of possible remediations in a common format that includes at least one of an identifier of the offering, a corresponding error message, a description of the problem, and a possible remediation for the problem.

5. The system of claim 1, wherein determining the plurality of efficacies corresponding to the second plurality of possible remediations is based on at least one of ranking feedback from a user of a possible remediation, a ranking of a possible remediation, a ranking of an on-line source of a possible remediation, a ranking of a contributor of a possible remediation to an on-line source of remediations, ranking a frequency of identified instances of a possible remediation, ranking a temporal proximity associated with a possible remediation, and a subject matter expert ranking of a possible remediation.

6. The system of claim 1, wherein each uniform resource locator provides a description of a corresponding possible remediation.

7. The system of claim 1, wherein a processor-based application further causes the one or more processors to:
   store, into a repository, the second plurality of possible remediations; and
   identify, from the repository, the second plurality of possible remediations, in response to receiving another indication of the problem associated with another offering.

8. A method comprising:
   identifying, from a plurality of on-line sources of remediations, a first plurality of possible remediations for a problem associated with an offering based on a specified degree of contextual details;
   adjusting the degree of contextual details when a number of identified possible remediations is at least one of above a maximum threshold or below a minimum threshold;
   identifying, from the plurality of on-line sources of remediations, a second plurality of possible remediations based on the adjusted degree of contextual details;
   determining a plurality of efficacies corresponding to the second plurality of possible remediations;
   arranging, based on the plurality of corresponding efficacies, each of the second plurality of possible remediations in order; and
   outputting, based on their corresponding order, the second plurality of possible remediations, wherein the outputted second plurality of possible remediations comprise a corresponding plurality of uniform resource locators that enable automated application of a corresponding possible remediation.

9. The method of claim 8, wherein the method further comprises receiving an indication of the problem associated with the offering, the indication of the problem being received via at least one of an error message through an application programming interface, an error message that is screen-scraped from a user interface, and a system user input.

10. The method of claim 8, wherein the plurality of on-line sources of remediations comprises at least one of support information that is associated with a vendor of the offering, support information that lacks association with the vendor of the offering, and a human intelligence marketplace.

11. The method of claim 8, wherein identifying the second plurality of possible remediations for the problem associated with the offering comprises normalizing the second plurality of possible remediations in a common format that includes at least one of an identifier of the offering, a corresponding error message, a description of the problem, and a possible remediation for the problem.

12. The method of claim 8, wherein determining the plurality of efficacies corresponding to the second plurality of possible remediations is based on at least one of ranking feedback from a user of a possible remediation, a ranking of a possible remediation, a ranking of an on-line source of a possible remediation, a ranking of a contributor of a possible remediation to an on-line source of remediations, ranking a frequency of identified instances of a possible remediation, ranking a temporal proximity associated with a possible remediation, and a subject matter expert ranking of a possible remediation.

13. The method of claim 8, wherein each uniform resource locator provides a description of a corresponding possible remediation.

14. The method of claim 8, wherein the method further comprises:
storing, into a repository, the second plurality of possible remediations; and
identifying, from the repository, the second plurality of possible remediations, in response to receiving another indication of the problem associated with another offering.

15. A computer program product, comprising a non-transitory computer-readable medium having a computer-readable program code embodied therein to be executed by one or more processors, the computer-readable program code including instructions to:
identify, from a plurality of on-line sources of remediations, a first plurality of possible remediations for a problem associated with an offering based on a specified degree of contextual details;
adjust the degree of contextual details when a number of identified possible remediations is at least one of above a maximum threshold or below a minimum threshold;
identify, from the plurality of on-line sources of remediations, a second plurality of possible remediations based on the adjusted degree of contextual details;
determine a plurality of efficacies corresponding to the second plurality of possible remediations;
arrange, based on the plurality of corresponding efficacies, each of the second plurality of possible remediations in order; and
output, based on their corresponding order, the second plurality of possible remediations, the outputted second plurality of possible remediations comprising a corresponding plurality of uniform resource locators that enable automated application of a corresponding possible remediation.

16. The computer program product of claim 15, wherein the computer-readable program code includes further instructions to receive an indication of the problem associated with the offering, the indication of the problem being received via at least one of an error message through an application programming interface, an error message that is screen-scraped from a user interface, and a system user input.

17. The computer program product of claim 15, wherein the plurality of on-line sources of remediations comprises at least one of support information that is associated with a vendor of the offering, support information that lacks association with the vendor of the offering, and a human intelligence marketplace, and identifying the second plurality of possible remediations for the problem associated with the offering comprises normalizing the second plurality of possible remediations in a common format that includes at least one of an identifier of the offering, a corresponding error message, a description of the problem, and a possible remediation for the problem.

18. The computer program product of claim 15, determining the plurality of efficacies corresponding to the second plurality of possible remediations is based on at least one of ranking feedback from a user of a possible remediation, a ranking of a possible remediation, a ranking of an on-line source of a possible remediation, a ranking of a contributor of a possible remediation to an on-line source of remediations, ranking a frequency of identified instances of a possible remediation, ranking a temporal proximity associated with a possible remediation, and a subject matter expert ranking of a possible remediation.

19. The computer program product of claim 15, wherein each uniform resource locator provides a description of a corresponding possible remediation.

20. The computer program product of claim 15, wherein the computer-readable program code includes further instructions to:
store, into a repository, the second plurality of possible remediations; and
identify, from the repository, the second plurality of possible remediations, in response to receiving another indication of the problem associated with another offering.

* * * * *